(12) United States Patent
Kostova (10) Patent No.: US 8,815,113 B2
(45) Date of Patent: Aug. 26, 2014

(54) BIODEGRADABLE HALOGEN-FREE FLAME RETARDANTS COMPOSITION AND METHODS FOR USE

(75) Inventor: Lydia Georgieva Kostova, Sofia (BG)

(73) Assignee: Interiorprotect, Ltd, Sofia (BG)

( * ) Notice: Subject to any disclaimer, the term of this patent is extended or adjusted under 35 U.S.C. 154(b) by 118 days.

(21) Appl. No.: 13/300,266

(22) Filed: Nov. 18, 2011

(65) Prior Publication Data

US 2012/0298906 A1    Nov. 29, 2012

(30) Foreign Application Priority Data

May 19, 2009  (BG) ...................................... 110389
May 14, 2010  (WO) ................ PCT/BG2010/000005

(51) Int. Cl.
*A62D 1/06* (2006.01)
*C09K 21/04* (2006.01)
*C09K 21/10* (2006.01)
*C09K 21/14* (2006.01)

(52) U.S. Cl.
USPC ............... 252/2; 252/601; 252/607; 252/608; 252/609

(58) Field of Classification Search
CPC ........ C09K 21/04; C09K 21/10; C09K 21/14; D06M 2200/30; B27K 3/52; B27K 2240/50
USPC .............................. 252/2, 601, 607, 608, 609
See application file for complete search history.

(56) References Cited

U.S. PATENT DOCUMENTS

| | | | |
|---|---|---|---|
| 3,900,327 A | | 8/1975 | Miller |
| 4,661,267 A | * | 4/1987 | Dekker et al. ................ 510/517 |
| 5,064,710 A | | 11/1991 | Gosz |
| 6,630,526 B2 | | 10/2003 | Heinen et al. |
| 6,989,113 B1 | | 1/2006 | Mabev |
| 2005/0054553 A1 | * | 3/2005 | Frankenbach et al. ........ 510/515 |
| 2008/0138534 A1 | | 6/2008 | Dineff |

FOREIGN PATENT DOCUMENTS

BG          33508         3/1983

OTHER PUBLICATIONS

English translation of BG33508 (1983).*
Marcos V. Martinez, International Search Report, WO2010/132962. Oct. 5, 2010.
Maros V. Martinez, Written Opinion of the International Searching Authority, PCT/bg2010/000005, Oct. 5, 2010.

* cited by examiner

*Primary Examiner* — Peter F Godenschwager
(74) *Attorney, Agent, or Firm* — Michael A. Mann; Nexsen Pruet, LLC (57) ABSTRACT

The invention relates to a biodegradable halogen-free flame retardants composition used for fire-safety and prevention, that limits and extinguishes fires by means of increased resistance to ignition, slowing down burning rates and the rate of heat, smoke and toxic gas release from polymers with different physical and chemical properties and structure, such as textiles, wooden materials, paper, cardboard, corrugated board, leather, cellular polystyrene, foamed polyurethane, and items made of them. The composition according to the invention contains orthophosphoric acid, urea, triethanolamine, ammonia water, polydimethylsiloxane, surfactant, which may be anionic, cationic, amphoteric, non-ionic or mixtures thereof and water.

11 Claims, 4 Drawing Sheets

BIODEGRADABLE HALOGEN-FREE FLAME RETARDANTS COMPOSITION AND METHODS FOR USE

CROSS-REFERENCE TO RELATED APPLICATIONS

This application claims priority to pending PCT/BG2010/000005 filed May 14, 2010 which, in turn, claims priority to BG 110389 filed May 19, 2009.

FIELD OF THE INVENTION

The invention relates to biodegradable halogen-free flame retardants composition, used for fire-safety and prevention, limiting and extinguishing fires by means of increased resistance to ignition, slowing down burning rates and the rate of heat, smoke and toxic gas release from polymers with different physical and chemical properties and structure, especially textiles, wooden materials, paper, cardboard, corrugated board, leather, cellular polystyrene, foamed polyurethane and items made of them.

BACKGROUND OF THE INVENTION

Fire causes death, serious injury and significant material damages. The risk of fire can be reduced by using flame retardants effective in both, the solid and gas phase of the burning process.

Literature and practice show the availability of halogen containing flame retardants, which contain bromine or chlorine. They have proven effective for achieving the desired fire-protection effect in low application concentrations. The mechanism of their action is in the gas phase of the burning process, where $H^+$ and $OH^-$ radicals are released from the burning gas in the flame burning phase, as a result of which the system is cooled-down and the formation of combustible gases and the release of heat are suppressed. During burning however, a major part of the halogen-containing flame retardants release halogen gases, harmful to human health and the environment.

In consideration of the protection of human health, as well as the environmental safety, now the phosphorus- and nitrogen-containing flame retardants are becoming widely used.

The phosphorus containing flame retardants, such as red phosphorus, phosphates, polyphosphates, organic phosphorus esters etc., are efficient in the solid phase of the burning process, where a charred layer is formed on material's surface, protecting it from the access of oxygen and heat that suppresses the formation and release of combustible gases, required for maintaining of the flame burning.

The nitrogen-containing flame retardants act, based on different mechanisms. Some of them form nitrogen netted structures in the treated material, which are relatively stable at high temperatures and prevent its decomposition and release of combustible gases. Other nitrogen-containing flame retardants release nitrogen as a gas, which dilutes the combustible gases, thus limiting the flame burning. The nitrogen-containing compounds display synergism with the phosphorus containing flame retardants by enhancing their effect.

There are many compositions of flame retardants, based on ammonium phosphates and methods for their production, described in the patent literature.

U.S. Pat. No. 3,900,327 illustrates a composition, which is a reaction product of the orthophosphoric acid or ammonium phosphate with ethylene oxide. It is known that the alkylene oxides, such as the ethylene oxide are toxic and carcinogenic, which makes the flame retardant practically unusable, although efficient as a flame retardant.

U.S. Pat. No. 6,989,113 describes a composition of a flame retardant, containing predominantly ammonium phosphate, urea, non-ionic surfactant, sugar and anti-foaming agent, which is used solely for fire protection of wooden surfaces.

As disclosed in RU2204582, the composition represents a dry-mixed composition of mono-, diammonium phosphate with urea and a surfactant. This fire-protection composition is used for treatment of cellulose-containing materials—wood, woven and non-woven fabrics, made of natural and mixed-type fibers, and paper.

Patent RU 2233296, as described in recent developments, is based on phosphorus- and nitrogen-containing components, as it does not only contain any halogen-containing compounds, but it also does not contain any surfactants either.

U.S. Pat. No. 5,064,710 outlines a composition that contains water solution of ammonium phosphate, an alkyl acid phosphate and a glycol, containing from 2 to 4 carbon atoms, which ensures reduced fume formation, during combustion of cardboard, when treated with the composition. However, this is only efficient for treatment of cellulosic materials, such as paper, plywood, fiber boards.

Patent BG 66022 (Patent application US 2008/138534 A1) describes a method of plasma chemical surface modification of porous materials and workpieces, where the treated materials are impregnated with the solution containing fire retardants according to BG 33508.

BG 33508 refers to a composition that ensures reduced combustibility of cotton textile materials. This formulation contains mainly orthophosphoric acid, urea, triethanolamine, ammonia water and optional surfactant-diisooctylsulphosuccinate, which is used solely for textile materials.

The main specific for the aforesaid compositions and the level of technique in this area, is that the efficiency of the known flame retardants is manifested selectively, with respect to certain types of polymers with various chemical structure.

In some fire-protection treatments, in case of swiftly changing humidity and high drying temperature of the impregnated materials there is an increased migration of the flame retardant towards the surface and unwanted depositions, which results in decreased fire-protection effect and deterioration of product's appearance.

A serious disadvantage for the fire protection of polymer materials by means of flame retardants is the trend for deterioration of their physical properties, such as loss of strength, which is a significant defect for certain materials such as fabrics, wooden materials, cardboard, leather and items, made of them.

Another shortcoming is the environmental safety of the ingredients of the flame retardants and the respective fire-protected polymers. The halogen-containing flame retardants are not safe, when being used, and in case of fire, they release toxic gases and smoke, which are very hazardous for human health, that could even cause death and serious injuries.

It is known that the toxic smoke is much more dangerous to people than the fire occurring as a result of ignition of polymer materials untreated with flame retardants. The U.S. Pat. No. 5,064,710 mentioned above, is the only example that provides data on smoke development tests of fire-protected cardboard.

There are not any compositions of flame retardants based on phosphorus- and nitrogen-compounds, known in the art, that could be applied to a wide range of porous hydrophilic and hydrophoblic polymers.

SUMMARY OF THE INVENTION

Fire protection effect depends on the uniformity, firmness and thickness of the insulating charred surface, and therefore, the flame retardants must enhance the result of the impregnation, i.e. higher quantity of flame retardant penetrates to a greater depth in the material, after a single application. The treated polymers must have a low smoke developed index when exposed to fire.

The principal object of the present invention is to create a general composition of biodegradable halogen-free flame retardants, efficient for hydrophilic and hydrophobic polymers, such as fabrics, wooden materials, leather, paper, cardboard, corrugated board, extruded and expanded cellular polystyrene, foamed polymers and items, made of them, irrespective of their physical and chemical properties and structure. The flame retardants of the composition provide a wide range of application methods, such as impregnation in an autoclave under pressure, plasma-assisted impregnation, continuous methods—soaking, draining and drying at high temperature, as well as energy-saving methods for "in situ" application, such as impregnation by dipping, pouring, brush application, roller application or by spraying at air pressure and room temperature.

The subject matter of the invention is the formulation of a composition of flame retardants, with percentages (%) by mass, as follows: orthophosphoric acid from 15 to 30, urea from 3 to 7, triethanolamine from 3 to 10, ammonia water from 15 to 30, polydimethylsiloxane from 0.1 to 4; surfactants (anionic, cationic, amphoteric or non-ionic or mixtures thereof) from 3.1 to 15 and water to 100.

The orthophosphoric acid is preferably 75-85% orthophosphoric acid. The polydimethylsiloxane is pure (100%) polydimethylsiloxane, with preferred viscosity determined at 25° C., from $20 \cdot 10^{-6}$ to $350 \cdot 10^{-6}$ m$^2$/s.

The following compounds are used in the invention as anionic surfactants:

Alkylsulphates with the following formula $ROSO_3^-$;

Alkylethersulphates with the following formula: $R(CH_2CH_2O)_nOSO_3^-$;

Alkylsulphonates with the following formula: $RSO_3^-$;

Salts of fatty acids with the following formula: $RCOO^-$; and

Sulphosuccinates with the following formula: $R(CH_2CH_2O)_nOCOCHSO_3CH_2COO^-$, where the R radical may be alkyl, alkene, alkyne or alkylaryl, and the value of n is 2 or 3.

The preferred anionic surfactants in the invention are the alkylethersulphates with length of the alkyl chain $C_6$-$C_{18}$ and/or the alkylsulphonates.

The cationic surfactants used in the invention are as follows:

Quaternary esters with the following formula: $(R_1OCH_2CH_2)(R_2OCH_2CH_2)CH_3(CH_2CH_2OH)N^+ CH_3OSO_3^-$; or Quaternary ammonium chlorides with the following formula: $R_1R_2(CH_3)_2N^+Cl^-$. where $R_1$ and $R_2$ may be alkyl radicals with chain length of $C_7$-$C_{22}$.

The preferred cationic surfactants in the invention are the alkylbenzyldimethylammonium chloride with alkyl chain length of $C_8$-$C_{14}$ or dialkylammoniumsulphate or triethanolaminestearatemethosulphate.

The following amphoteric surfactants or so called zwitterions are used in the invention:

Alkylbetaines with the following formula: $R(CH_3)_2N^+CH_2COO^-$; or

Alkylamidopropylbetaines with the following formula: $RCONH(CH_2)_3(CH_3)_2N^+CH_2COO^-$, where R may be alkyl, alkene, alkyne, alkylaryl with chain length of $C_8$-$C_{18}$.

The preferred amphoteric surfactants in the invention are the alkylamidopropylbetaines.

The following non-ionic surfactants are used in the invention:

Ethoxylated alcohols with the following formula: $R_1(CH_2CH_2O)_nOH$; or

Ethoxylated alkylphenols with the following formula: $R_2Ar(CH_2CH_2O)_nOH$ where $R_1$ is an alkyl radical with chain length of $C_6$ to $C_{22}$;

$R_2$ is an octyl or nonyl radical;

Ar is an aryl radical.

The preferred non-ionic surfactants in the invention are ethoxylated alcohols.

In flaming conditions, the surfactants included in the compositions of the flame retardants, according to the invention, enhance the formation of an uniform, firm, thick and dense surface charred layer, which effectively slows down the burning rate and the amount of the released heat and toxic smoke.

The composition according to the invention is formed by mixing orthophosphoric acid and urea, heating the resulting reaction mixture from 40° C. to 50° C. under stirring continuously. At the end of their interaction, the mixture is cooled down to 20-25° C., diluted with water and homogenized. Following, the triethanolamine, ammonia water, polydimethylsiloxane and the surfactants are added, stirring until the mixture is homogenized. Due to the strong exothermic process that takes place in the reactor, an intensive cooling is needed.

The composition of the invention may be applied to the treated materials utilizing various methods:

1) Impregnation by Spraying

The materials are impregnated at atmospheric pressure and room temperature using a pulverized device, e.g. by means of an air pistol from a distance of at least 40 cm, strictly observing the relevant consumption rate for the respective material. The treated materials are dried at room temperature.

In this way, the composition of the flame retardant, according to the invention, may be used to treat various materials and items made of them, such as:

hydrophilic textile materials, such as cotton, silk, hemp, linen, wool, viscose;

hydrophobic textile materials, such as polyester, polyacrylnitrile, polyamide, polypropylene, polyethylene and their blends;

wooden materials, such as wood and wooden products, beams, boards, plywood and plywood based products, wooden particle boards, wooden fiber boards, MDF, HDF;

cellulosic materials, such as paper, cardboard, pressed cardboard, corrugated board;

natural and artificial leather;

foamed polymers, such as foamed polyurethane;

expanded and extruded cellular polystyrene.

2) By Continuous Methods—Soaking, Draining and Drying at High Temperature.

This is a continuous treatment method, where the non-treated material passes through a bath with a small module, containing the flame retardant, i.e. dipping in a bath, full of the respective composition of the flame retardant according to the invention. After soaking in the bath, the material passes between rollers, where applying controlled pressure, it is drained so that only the specified quantity of the flame retardant remains in the material, and after that it passes at an appropriate speed and at temperature, appropriate for drying the respective material through a drying machine.

This treatment method is appropriate for hydrophilic and hydrophobic textile materials; cellulosic materials, such as paper, foamed polymers, such as foamed polyurethane on rolls.

3) By Impregnation in a Pressurized Autoclave

The impregnation under pressure in an autoclave ensures partial filling of the free volume of the wooden materials with flame retardants and greater penetration depth. The drying takes place in a drier at atmospheric pressure.

The introduction of the vacuum technologies in the drying and wood impregnation creates a significant diversity of technological impregnation options. Various technological cycles, such as "vacuum-atmospheric pressure-vacuum", "vacuum-high pressure-vacuum", pulse impregnation by means of brief alternation of vacuum and high pressure, cyclic impregnation with alteration of "vacuum-pressure" cycles, combining vacuum drying and vacuum impregnation in a single autoclave.

This treatment method is appropriate for wooden materials, such as solid wood and wooden items, beams and boards.

4) By Means of Plasma-Assisted Impregnation

The materials are treated at atmospheric pressure, using a plasma device with cold plasma obtained from a barrier electric discharge. After the primary plasma-chemical surface modification, the materials are impregnated, with the composition of the respective flame retardant according to the invention.

This treatment method is appropriate for hydrophilic and hydrophobic textile materials; wooden materials, such as solid wood and wooden products, beams, boards, plywood and plywood-based products, wood particles boards, wood fibres boards, MDF, HDF; cellulosic materials, such as paper, cardboard, pressed cardboard, corrugated board; natural and artificial leather; foamed polymers, such as foamed polyurethane; expanded and extruded cellular polystyrene.

5) Energy-Saving Impregnation by Means of Simple Dipping, Pouring, Brush Application, Roller Application This treatment method is appropriate for wooden materials, such as solid wood and wooden products, beams, boards, plywood and plywood-based products, wood particles boards, wood fibres boards, MDF, HDF; foamed polymers, such as foamed polyurethane; expanded and extruded cellular polystyrene.

The compositions of the flame retardants may be used in combination with softeners, wetting agents and other textile auxiliaries, after preliminary tests are carried out with respect to the stability of the solutions and their possible negative effect on material's flammability.

Wooden materials, impregnated with the compositions of the flame retardants according to the invention, may be treated with paints and polishes, after tests for compatibility with the used solutions of the flame retardants and the impregnation technology are performed.

The compositions of the flame retardants according to the invention, applied to wooden materials may be combined also with any suitable insecticide and any suitable mold inhibitor.

The composition of the flame retardant according to the invention may also serve as fire-extinguishing media, if used in fire-extinguishers and sprinkler systems. It is used in pressurized liquid fire-extinguishers, approved for class A fires, which includes ignition of paper, wooden materials and textiles. The fire-extinguishing compositions are easy to use and environmentally friendlier than those working with water and powder.

They can be used in sprinkler systems for extinguishing fires in hotels, hospitals, schools, public and residential buildings, as well as for extinguishing forest fires.

The tests, performed regarding the corrosive effect of the flame retardants according to the invention on steel plates X18H10T, show that the composition of the invention does not have any corrosive effect on the metal parts of the equipment for production, transport and the machines used for the industrial application.

When working with the composition of the flame retardant according to the invention, there were not any skin rashes or erythema in people, while working with the product, which serves as an evidence of the absence of toxic properties.

Tests with enzymes with phosphatase activity were performed to determine the biodegradability of the composition of the flame retardant according to the invention.

Tests were performed for the biodegradation of hydrophobic and hydrophilic polymers, fire-protected with flame retardant according to the invention.

The hydrophobic polymers, based on polypropylene, polyester, polyacrylnitrile, polyamide, polyethylene, cellular polystyrene and foamed polyurethane were treated with the enzymes lipase and esterase of various microbe strains. The hydrophilic polymers, such as cellulosic and woolen textile materials, wooden materials, paper, natural leather, were treated with proteolytic enzymes, laccase and cellulase complexes. Microbe stain, such as *Phanaerochete chrysosporium* with high lignin decomposition activity was also used.

It was determined that all the polymers, fire-protected with the composition of the flame retardant according to the invention are biodegradable.

Tests were performed for determining the smoke developing of the polymers, fire-protected with the composition of the flame retardant according to the invention, applying the methods, described in Tzenov, Tz. "Construction materials— burning behaviour", Sofia, "Albatros" 1996, as follows:

At least three samples of the polymer material are measured, each with a weight of 0.001 kg. The test sample is placed in a smoke chamber at a temperature of 100° C., 150° C., 300° C., 450° C. and 600° C.

The smoke developed index is calculated, based on the following formula:

$$D_m = (V/L \cdot m_0)_{(lg} I_0/I_{min})$$

where $D_m$—smoke developed index, $[m^3 \cdot m^{-1} \cdot kg^{-1}]$
V—volume of the smoke chamber (0.9×0.9×0.6 m)=0.486 $[m^3]$
L—beam length (as generated by a He—Ne laser with wave length λ=632.8 nm), 2.5 mW, passing through the smoke chamber
$m_0$—mass of the tested polymer sample, [kg]
$I_0$—initial value of the He—Ne laser beam power in the chamber without smoke, [mA]
Imin—minimum value of the He—Ne laser beam power in the smoke-filled chamber, [mA].

The $I_0$ and $I_{min}$ values are calculated by a special detector. The polymer materials, depending on the smoke developed index $D_m$ are classified as:

materials with low smoke development capability—$D_m$=0-50 $[m^3 \cdot m^{-1} \cdot kg^{-1}]$ materials with medium smoke development capability—$D_m$=50-500 $[m^3 \cdot m^{-1} \cdot kg^{-1}]$ materials with high smoke development capability—$D_m \geq 500$ $[m^3 \cdot m^{-1} \cdot kg^{-1}]$.

It was determined that the smoke development of polymers, fire-protected by the flame retardant according to the invention is with a low index, which indicated that in case of fire less toxic smoke will be released.

The efficiency of the flame retardants according to the invention was proven by means of tests for determining the burning behaviour of treated test specimens of various materials, according to the following standards:

for textile materials—BDS EN ISO 6941; JAR(FAR) §25.853 and Fiche UIC 564-2;

for wooden materials—CAN/ULC-S102, ASTM E 84, DIN 4102/1998 and EN ISO 11 925-2, BDS 16359/86;

the polystyrene, impregnated with the composition of the flame retardant according to the invention, meets the requirements of BDS ISO 9772:2004;

the foamed polyurethane, impregnated with a composition of the flame retardant according to the invention meets the requirements of JAR(FAR) §25.853 and BDS ISO 9772:2004.

The test methods, according to the aforesaid standards are, as follows:

A) BDS EN ISO 6941 Textile fabrics—Burning behaviour, measurement of flame spread properties of vertically oriented specimens.

This European standard, details the method of measurement of flame spread time of vertically oriented textile materials. The dimensions of each specimen are 560 mm×170 mm. The number of the specimens for testing is 24, as 12 are cut in a longitudinal, and the other 12 in transverse direction of the textile material.

Marking threads are placed at certain positions, horizontally on the test specimen.

The test specimen is placed on carrying pins on a rectangular frame. The frame is fixed onto an appropriate stand, placed in a chamber.

The specimens are subjected to the effects of a gas burner (propane-butane) with flame height of 40±1 mm, for 15 seconds.

The textile material is classified as Class 1 (difficult to ignite material) if the sustained flame (duration of flaming) is 5 seconds and if the first marking thread is not burnt.

B) JAR (FAR) 25.853. This method is applicable to interior polymer materials, which are used in civil and cargo airplanes.

A minimum of 3 specimens must be tested. The materials must be tested either as section, cut from fabricated part as installed in the airplane, or as specimen simulating a cut section. The specimen may be cut from any location in a fabricated part. The specimen must be fixed firmly in a specimen frame, placed in a fireplace or combustion chamber.

In case of the vertical method, the lower edge of the specimen must be 19 mm above the top edge of a gas burner (propane/butane) with flame temperature of 843° C.

The flame must be applied for 60 seconds and then removed. The main criteria for the assessment of the burning behavior are the flame time, in seconds and the burnt length, in millimeters.

The polymer material is classified as difficult to ignite material (self-extinguishing), if the test specimen extinguishes after the removal of the flame, and the front of the burnt length does not reach the marking and no flaming droplets are recorded.

C) Fiche UIC 564-2. Test method for determining the fire resistance of coated and uncoated textiles The subject matter of this method is the exposure of a textile material to the flame of a gas burner (propane-butane) for a certain period of time. Six test specimens with dimensions 190×320 mm are measured—three in warp direction and three in weft direction. The burner is inclined at an angle of 45° and is placed close to the test specimen in such a way, that the blue cone of the flame touches the lower edge of the test specimen. After that, the specimen has cooled and the charred area is measured. The "charred section" is defined as the area destroyed and actually charred. Areas where deformation, color change, etc. have occurred are not part of the fire damaged area.

Progress of the test shall be observed and the following points noted:

length of time of continued burning or glowing and the burning or glowing of the burning particles or drops after extinction of burner;

the charred area in $cm^2$;

possible release of burning particles or drops;

the degree to which the upper edge of the test specimen is fire damaged.

D) Methods, based on DIN 4102 Part 1, B2 (analogous test method EN ISO 11925-2). Determining the combustibility of building products and structural elements. Determining the difficult to ignite materials.

This method is used for classification of building products and structural elements, according to the European System for class B, $B_{fl}$, C, $C_{fl}$, D, $D_{fl}$, E and $E_{fl}$. The method is used for testing all types of building and structural products, for which class B2 is required.

18 test samples with dimensions 900 mm×230 mm are required for the test. The specimens are installed vertically in a combustion chamber. The fire is induced on the lower edge and/or the surface of the specimens by means of the flame of a gas burner.

The ignition time is recorded, as well as the possible release of burning particles and whether the front of the burnt area reaches the upper marking for a certain period of time of inducing fire from the flame source.

E) CAN/ULC-S102 (similar method ASTM E 84). Standard method of test for "Surface Burning Characteristics of Building Materials and Assemblies"

This method is designed to determine the relative surface burning characteristics of the material by evaluating the flame spread over its surface and measuring the density of the smoke developed, compared to a selected type of red oak and noncombustible material, under specific test conditions. The Classification of the materials concerns the flame spread (FSC) and smoke developed (SD).

The test specimens are 7315 mm long and 508 mm wide. Prior to testing, they are conditioned at 23±3° C. and relative humidity of 50±5%.

The specimens are placed in a tunnel furnace with controlled airflow and flame sources (gas burners). The spreading of the flame on the surface of the specimens is recorded at every 15 seconds. During the test, the ignition of the material and the spreading of the flame within a certain time are recorded, as well as the smoke development of the test samples.

F) BDS 16359/86. Protective agents for wood. Method for determining the flame retardant properties.

The subject matter of this method is the exposure of pine wood to the flame of a gas burner. At least ten test specimens are measured. The test specimens are prepared as a rectangular prism with the following dimensions: height 30 mm, width 60 mm and length 150 mm. The test specimens are mounted vertically in a ceramic tube at 200° C. and tested for a period of 2 minutes. The mass loss of the test specimen, Δm, in percents, is determined with a precision of 0.1% applying the following formula:

$$\Delta m = ((m_1 - m_2)/m_1)100,$$

where $m_1$—the mass of the test specimen prior to testing, g;
$m_2$—the mass of the test specimen after testing, g;
The average of the 10 values, round to 1%, is considered as a test result.

The mass loss, varying from the average by more than 5%, is not taken into consideration for the calculations. New test specimens are prepared, instead of those ones.

According to the information appendix to BDS 16359/86, the value and allowance of the method indicator is to amount to 9% mass loss. In case of weight loss of up to 9% the protected specimens are difficult to ignite (self-extinguishing), and therefore the flame retardant is designated as difficult to ignite (self-extinguishing).

G) BDS ISO 9772:2004. Cellular plastics. Determination of horizontal burning characteristics of small specimens subjected to a small flame.

This method is designed for laboratory testing, allowing comparison to the relative burning characteristics of test-specimens of foamed plastics, in horizontal position, with density of at least 250 kg/m$^3$. At least 20 test specimens with length 150±10 mm and width 50±10 mm are prepared. The test specimens must be placed on a support of metal mesh, positioned in a certain way in the fireplace. The test specimens are subjected to the flame of a gas burner for 60 seconds.

For the classification of the materials in classes HF-1, HF-2, HF-3, the linear burning rate, the after flaming are recorded, as well as the duration of the flameless ignition of a cotton pad, from ignited drops and particles and damaged length of each similar object.

Figure 1:
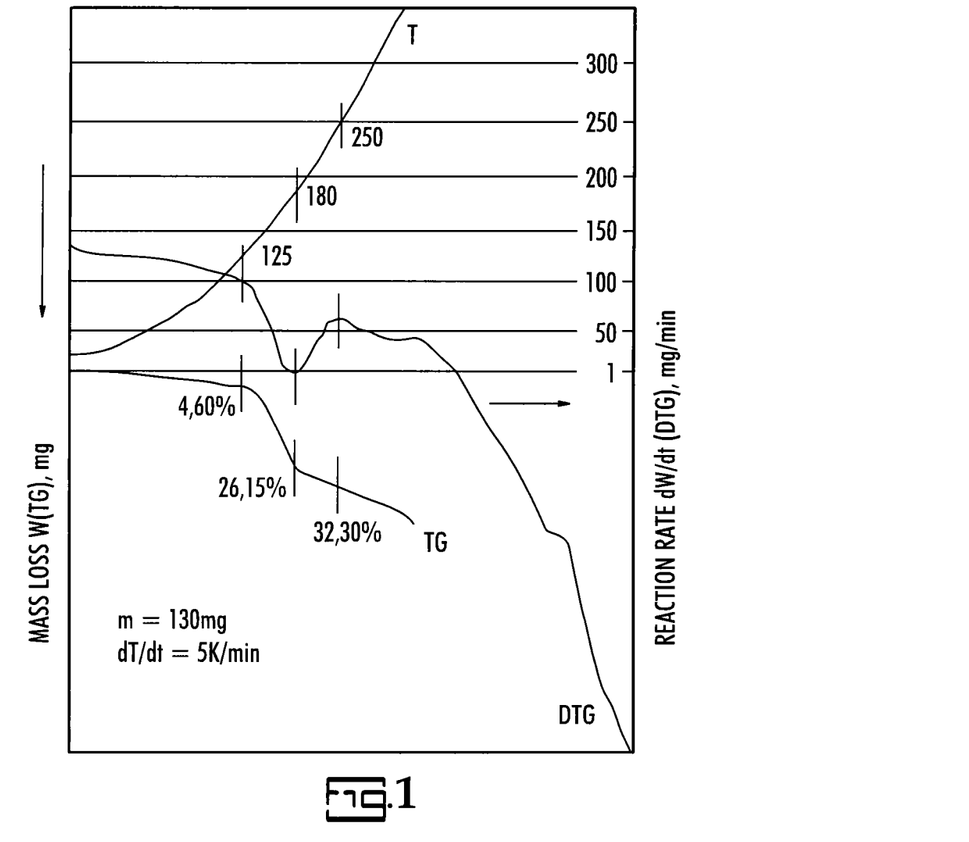
FIG. 1—Thermogravimetric analysis (TGA) of flame retardants, based on phosphorus and nitrogen compounds.

The efficiency of the flame retardants according to the invention, is proven by applying the methods of thermogravimetric analysis (TGA), the differential thermal analysis (DTA) and the differential scanning calorimetry (DSC), as shown in FIG. 1.

Figure 2:
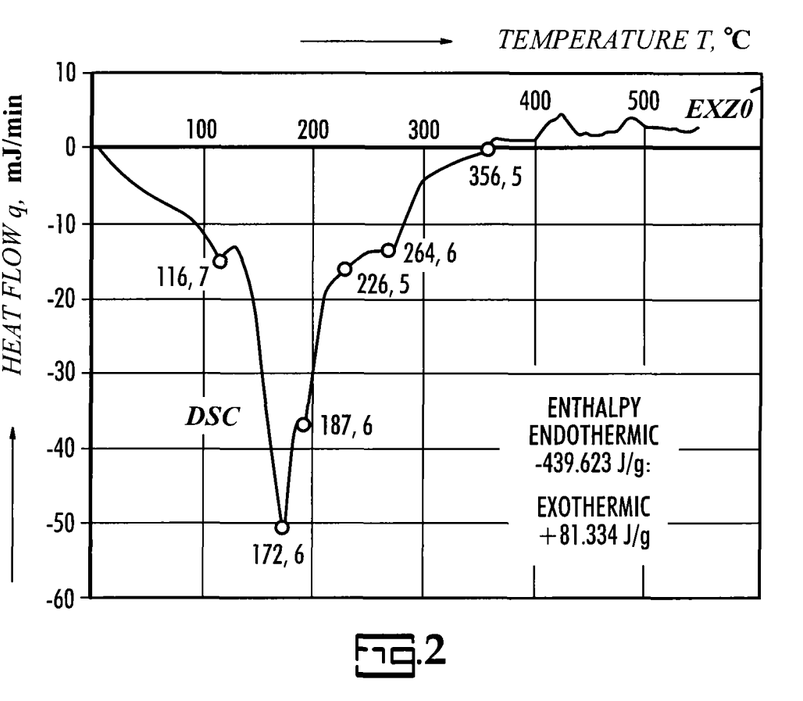
FIG. 2—Differential scanning calorimetry (DSC) of a flame retardant solution, based on phosphorus and nitrogen compounds.

The results of the thermogravimetric analysis of the developed flame retardants (based on a dry ingredient), show its thermal stability at temperatures up to 125° C. The first stage of the TG-curve is determined from the release of the volatile components and mostly of water (4.60%). Significant thermal decomposition, where substances, blocking the release of the combustible gases, e.g. phosphoric acid, are formed, is represented by the maximum of the DTG-curve at 185° C.—in the interval from 125° C. to 250° C., where the dry substance loses about 27.7% of its mass. This process is characterized by a heat absorption up to 356° C., as the total endothermic effect is 439.6 J/g. The exothermic effect of the decomposition above that temperature is approximately 5 times lower −81.3 J/g, FIG. 2.

Therefore the invented flame retardants have behaviour, specific for the phosphorus containing flame retardants—the temperature interval for activation of the flame retardant is from 125° C. to 250° C. The activation takes places in endothermic regime with mass loss of more than 20% from the initial weight of the flame retardant.

The specialists in this area are aware that most effective are the flame retardants, which form a protective charred layer below 300° C. The invented flame retardants, as evidenced by the DTA-TGA thermal tests, form a firm, dense and thick charred layer below 250° C., which does not allow any heat or oxygen to penetrate beyond the area of thermal decomposition of the polymer, and the combustible gases, released in the process of thermal decomposition—to reach the area of flaming and feed it.

The thickness and morphology of the charred layer formed determines also the quality of the flame retardants.

DESCRIPTION

The advantages of the flame retardants, based on the composition according to this invention, are detailed below:

they are applicable for a wide range of hydrophilic and hydrophobic polymers and provide a high fire protection level of the treated materials;

increase the fire resistance of the treated materials;

slow down the burning rate, the amount of released heat, toxic gases and the smoke development during the exposure to fire;

may be used as fire-extinguishing media as well;

enhance the impregnation result—larger quantities of flame retardant, penetrating to a greater depth in the material with single application;

do not deteriorate the physical and mechanical indexes and the appearance of the materials, treated with the flame retardant;

non-toxic;

the flame retardants, as well as the polymers, treated with them are biodegradable, which ensures a positive environmental effect;

have low price;

appropriate for application both by industrial scale-up treatment and "in situ" energy-saving technologies (at normal atmospheric pressure and room temperature), such as dipping, pouring, brush application, roller application or by spraying.

EXAMPLES FOR IMPLEMENTATION OF THE INVENTION

This invention is illustrated, but in no way limited, by the following examples.

Textile Materials

The compositions of the flame retardants, according to the invention are applicable to fire protection and slowing down the smoke development of both hydrophilic textile materials, such as cotton, silk, hemp, linen, wool, viscose, and hydrophobic textile materials, such as polyester, polyacrylnitrile, polyamide, polypropylene, polyethylene and their blends.

Example 1

In one preferred embodiment the flame retardant for cellulosic textile materials is prepared by a composition, which contains, with percentages (%) by mass: 85% orthophosphoric acid—15.0; urea—3.0; triethanolamine—4.0; ammonia water—15.0; polydimethylsiloxane with kinematic viscosity, 20·10$^{-6}$ m$^2$/s—1.5, dialkyldimethylammonium sulphate—3.1 and water—58.4.

The orthophosphoric acid and the urea are mixed and the obtained reaction mixture is heated up from 40° C. to 50° C. with continuous stirring. After the finalization of the interaction, the mixture is cooled down to 20-25° C., diluted with water and homogenized. Then the triethanolamine, ammonia water, polydimethylsiloxane and dialkyldimethylammonium sulphate (surfactant) are added, while continuously stirring until the finished mixture is homogenized.

The phosphates content in the cellulosic materials, such as $P_2O_5\%$ is within the scope 3.20 to 9.64, depending on the type of fibers, the structure of the fabric, its preliminary treatment and the desired self-extinguishing level.

Example 2

In another embodiment the flame retardant for hydrophobic textile materials (such as polyester, polyamide, polypropylene) and their blends with hydrophilic materials, is prepared from a composition which contains with percentages (%) by mass: 85% orthophosphoric acid—25.0; urea—6.0; triethanolamine—5.0; ammonia water—25.0; polydimethylsiloxane with viscosity $100 \cdot 10^{-6}$ m$^2$/s—2.5, mixture of alkyl ($C_6$-$C_{18}$) sulphates and sulphonates—7.5 and water—29.0.

The composition is prepared based on the methods, detailed in Example 1. The phosphates content in the polymer materials, such as $P_2O_5\%$ is within the range from 3.70 to 7.50.

Example 3

In a different embodiment the flame retardant for hydrophobic textile materials (such as polyacrylnitrile, polyacrylnitrile/polyester blends) is prepared from a composition, which contains with percentages (%) by mass: 85% orthophosphoric acid—16.0; urea—3.0; triethanolamine—4.0; ammonia water—20.0; polydimethylsiloxane with viscosity $100 \cdot 10^{-6}$ m$^2$/s—2.0, mixture of alkyl ($C_6$-$C_{18}$) sulphates and sulphonates—7.5, alkylamydopropylbetaine—2.5 and water—45.0.

The composition is prepared, based on the method, detailed in Example 1.

The phosphates content in the hydrophobic materials, such as $P_2O_5\%$ is within the range from 4.80 to 12.80.

Example 4

In other embodiment the flame retardant for polyethylene fabrics is prepared from a composition, which contains with percentages (%) by mass: 85% orthophosphoric acid—30.0; urea—7.0; triethanolamine—9.0; ammonia water—29.0; polydimethylsiloxane with viscosity $350 \cdot 10^{-6}$ m$^2$/s—0.5, alkylethersulphate with alkyl chain length ($C_6$-$C_{18}$) and alkyl sulphonates—10.0 and water—14.5.

The composition is prepared, based on the method, detailed in Example 1. The phosphates content in the polymer materials, such as $P_2O_5\%$ is within the range from 3.21 to 4.60.

The flame retarded textile materials, treated with the compositions according to the invention satisfy the test requirements of the following standards: BDS EN ISO 13934-1: 2002 Textile—Tensile properties of fabrics—Part 1: Determination of maximum force and elongation at maximum force using the strip method; BDS EN ISO 13937-1: 2002 Textile—Tear properties of fabrics—Part 1: Determination of tear force using ballistic pendulum method (Elmendorf); BDS 9586:1992 Textiles. Fabrics. Methods for determination of drapery characteristics; BDS EN ISO 12947—:2002 Textiles—Determination of the abrasion resistance of fabrics by the Martindale method—Part 2: Determination of specimen breakdown; Color difference determined according to BDS EN ISO 105-J03L:2001.

The test results for abrasion resistance of the treated fabrics indicate that the fabric quality has been improved. The waste of all the tested impregnated fabrics is less than the waste of the untreated materials.

The burning behaviour of the flame retarded, textile materials is in accordance with BDS EN ISO 6941, JAR(FAR) §25.853 and Fiche UIC 564-2. The treated textiles are classified as difficult to ignite materials which extinguish after the removal of the flame of the burner and no flaming droplets are released. The flame retarded textile materials are with low smoke developed indexes.

Examples for the smoke developed indexes of some of the tested materials are shown in Tables 1-4.

TABLE 1

Smoke developed by fire-protected cotton textile material

| test No. | T °C. | Type of material | $I_o$ μA | $I_{min}$ μA | $I_{min\,av.}$ | $D_{max\,av.}$ (m$^3$/m · kg) | Note | Conclusions |
|---|---|---|---|---|---|---|---|---|
| 1-1 | 300 | Cotton | 25 | 18.10 | 18.16 | 46.93 | no self-ignition | low smoke developed index |
| 1-2 | 300 | Cotton | 25 | 18.00 | | | | |
| 1-3 | 300 | Cotton | 25 | 18.40 | | | | |
| 2-1 | 450 | Cotton | 25 | 17.30 | 17.06 | 86.71 | no self-ignition | medium smoke developed index |
| 2-2 | 450 | Cotton | 25 | 17.00 | | | | |
| 2-3 | 450 | Cotton | 25 | 16.90 | | | | |
| 3-1 | 600 | Cotton | 25 | 20.20 | 20.03 | 50.31 | no self-ignition | medium smoke developed index |
| 3-2 | 600 | Cotton | 25 | 20.10 | | | | |
| 3-3 | 600 | Cotton | 25 | 19.80 | | | | |

TABLE 2

Smoke developed by fire-protected polyester textile material

| test No. | T °C. | Type of material | $I_o$ μA | $I_{min}$ μA | $I_{min\,av.}$ | $D_{max\,av.}$ (m$^3$/m · kg) | Note | Conclusions |
|---|---|---|---|---|---|---|---|---|
| 1-1 | 300 | Polyester | 25 | 20.60 | 20.70 | 42.87 | no self-ignition | low smoke developed index |
| 1-2 | 300 | Polyester | 25 | 20.80 | | | | |
| 1-3 | 300 | Polyester | 25 | 20.70 | | | | |
| 2-1 | 450 | Polyester | 25 | 19.60 | 19.56 | 54.66 | no self-ignition | medium smoke developed index |
| 2-2 | 450 | Polyester | 25 | 19.70 | | | | |

TABLE 2-continued

Smoke developed by fire-protected polyester textile material

| test No. | T °C. | Type of material | $I_o$ μA | $I_{min}$ μA | $I_{min\,av.}$ | $D_{max\,av.}$ (m³/m · kg) | Note | Conclusions |
|---|---|---|---|---|---|---|---|---|
| 2-3 | 450 | Polyester | 25 | 19.40 | | | | |
| 3-1 | 600 | Polyester | 25 | 6.10 | 6.13 | 319.20 | no self-ignition | medium smoke developed index |
| 3-2 | 600 | Polyester | 25 | 6.00 | | | | |
| 3-3 | 600 | Polyester | 25 | 6.30 | | | | |

TABLE 3

Smoke developed by fire-protected textile material, polyacrylnitrile/polyester blend

| test No. | T °C. | Type of material | $I_o$ μA | $I_{min}$ μA | $I_{min\,av.}$ | $D_{max\,av.}$ (m³/m · kg) | Note | Conclusions |
|---|---|---|---|---|---|---|---|---|
| 1-1 | 300 | 74% Polyacryl 26% Polyester | 25 | 19.90 | 20.06 | 49.93 | no self-ignition | low smoke developed index |
| 1-2 | 300 | 74% Polyacryl 26% Polyester | 25 | 20.20 | | | | |
| 1-3 | 300 | 74% Polyacryl 26% Polyester | 25 | 20.10 | | | | |
| 2-1 | 450 | 74% Polyacryl 26% Polyester | 25 | 6.20 | 6.16 | 317.96 | no self-ignition | medium smoke developed index |
| 2-2 | 450 | 74% Polyacryl 26% Polyester | 25 | 6.00 | | | | |
| 2-3 | 450 | 74% Polyacryl 26% Polyester | 25 | 6.30 | | | | |
| 3-1 | 600 | 74% Polyacryl 26% Polyester | 25 | 8.20 | 8.43 | 246.86 | no self-ignition | medium smoke developed index |
| 3-2 | 600 | 74% Polyacryl 26% Polyester | 25 | 8.50 | | | | |
| 3-3 | 600 | 74% Polyacryl 26% Polyester | 25 | 8.60 | | | | |

TABLE 4

Smoke developed by polyethylene fabrics

| test No. | T °C. | Type of material | $I_o$ μA | $I_{min}$ μA | $I_{min\,av.}$ | $D_{max\,av.}$ (m³/m · kg) | Note | Conclusions |
|---|---|---|---|---|---|---|---|---|
| 1-1 | 300 | Non-treated Polyethylene | 25 | 17.90 | 17.93 | 75.46 | no self-ignition | medium smoke developed index |
| 1-2 | 300 | Non-treated Polyethylene | 25 | 17.70 | | | | |
| 1-3 | 300 | Non-treated Polyethylene | 25 | 18.20 | | | | |
| 2-1 | 450 | Non-treated Polyethylene | 25 | 3.60 | 3.63 | 438.46 | no self-ignition | medium smoke developed index |
| 2-2 | 450 | Non-treated Polyethylene | 25 | 3.40 | | | | |
| 2-3 | 450 | Non-treated Polyethylene | 25 | 3.90 | | | | |
| 3-1 | 600 | Non-treated Polyethylene | 25 | 13.40 | 13.60 | 143.90 | self-ignition at 600° C. after 7-9 s and the smoke is grayish-white | medium smoke developed index |
| 3-2 | 600 | Non-treated Polyethylene | 25 | 13.10 | | | | |
| 3-3 | 600 | Non-treated Polyethylene | 25 | 13.30 | | | | |
| 1-1 | 300 | Treated Polyethylene | 25 | 19.20 | 19.36 | 58.00 | no self-ignition | medium smoke developed index |
| 1-2 | 300 | Treated Polyethylene | 25 | 19.60 | | | | |
| 1-3 | 300 | Treated Polyethylene | 25 | 19.30 | | | | |
| 2-1 | 450 | Treated Polyethylene | 25 | 14.00 | 14.16 | 129.36 | no self-ignition | medium smoke developed index |
| 2-2 | 450 | Treated Polyethylene | 25 | 14.40 | | | | |
| 2-3 | 450 | Treated Polyethylene | 25 | 14.10 | | | | |
| 3-1 | 600 | Treated Polyethylene | 25 | 13.40 | 13.40 | 141.60 | self-ignition at 600° C. after | medium smoke developed |

TABLE 4-continued

Smoke developed by polyethylene fabrics

| test No. | T °C. | Type of material | $I_o$ μA | $I_{min}$ μA | $I_{min\,av.}$ | $D_{max\,av.}$ (m³/m · kg) | Note | Conclusions |
|---|---|---|---|---|---|---|---|---|
| 3-2 | 600 | Treated Polyethylene | 25 | 13.70 | | | 17-22 s and the smoke is grayish-white | index |
| 3-3 | 600 | Treated Polyethylene | 25 | 13.10 | | | | |

Wooden Materials

The compositions of the flame retardants are applicable to fire protection and slowing down smoke development for wide range of wooden materials, such as: solid wood and wooden products, beams, boards, plywood and plywood-based products, wood particles boards, wood fibres boards, MDF, HDF.

Example 5

In the fifth embodiment the flame retardant for Douglas Fir is prepared from a composition, which contains with percentages (%) by mass: 85% orthophosphoric acid—22.0, urea—5.0, triethanolamine—8.0, ammonia water—25.0, polydimethylsiloxane with viscosity $20 \cdot 10^{-6}$ m²/s—1.5, mixture of alkylbenzyldimethylammonium chloride with alkyl chain length ($C_8$-$C_{14}$) and alkylamydopropylbetaine—14.0 and water—24.5.

The composition is prepared, based on the method, detailed in Example 1.

The Douglas Fir impregnated with the flame retardant was tested in accordance with CAN/ULC-S 102 (similar standard ASTM E 84) and showed flame spreading rate FSC-35, smoke developed index SDI-170 according to CAN/ULC-S 102 and FSC-32, SDI-170 according to ASTM E 84.

The performed TGA, DTA and DSC thermal analyses on non-treated Douglas Fir and Douglas Fir treated with the flame retardant according to the invention, indicate that the impregnated Douglas Fir slows down the burning process by more than 50% and burns for approximately 30 minutes, unlike the non-treated Douglas Fir which burns for 10 minutes.

Example 6

In another embodiment the flame retardant for pine wood is prepared from a composition, which contains with percentages (%) by mass: 85% orthophosphoric acid—22.0, urea—5.0, triethanolamine—10.0, ammonia water—18.0, polydimethylsiloxane with viscosity $20 \cdot 10^{-6}$ m²/s—0.2, mixture of alkyl ($C_6$-$C_{18}$) sulphates and sulphonates—3.5 and water 41.3.

The composition is prepared, based on the method, detailed in Example 1.

The wooden building product made of pine wood was treated by means of a plasma device with cold plasma, at atmospheric pressure, obtained from a barrier electric discharge at frequency 30 kHz for a period of 10 s. After the preliminary plasma-chemical surface modification, the wooden product was impregnated by means of a brush with the composition indicated in this example. The phosphates content in the material as $P_2O_5$% is 5.98%.

The pine wood product was tested in order to determine its combustibility according to DIN 4102/1998 and was classified as self-extinguishing (Class B1).

The mode of delaying the burning process is studied by means of thermal analysis of two samples—control sample and sample, protected with flame retardant for pine wood which is introduced by means of a plasma-assisted impregnation, as the preliminary plasma-chemical activation is realized for 1 min at voltage of 15 kV (50 Hz) and at atmospheric pressure. The experimental conditions for all thermal tests—DTG, DTG and DSC, performed in air environment on Perkin-Elmer equipment, are as follows: heating rate 10 K/min with heating range from room temperature to 600° C.

Figure 3A:
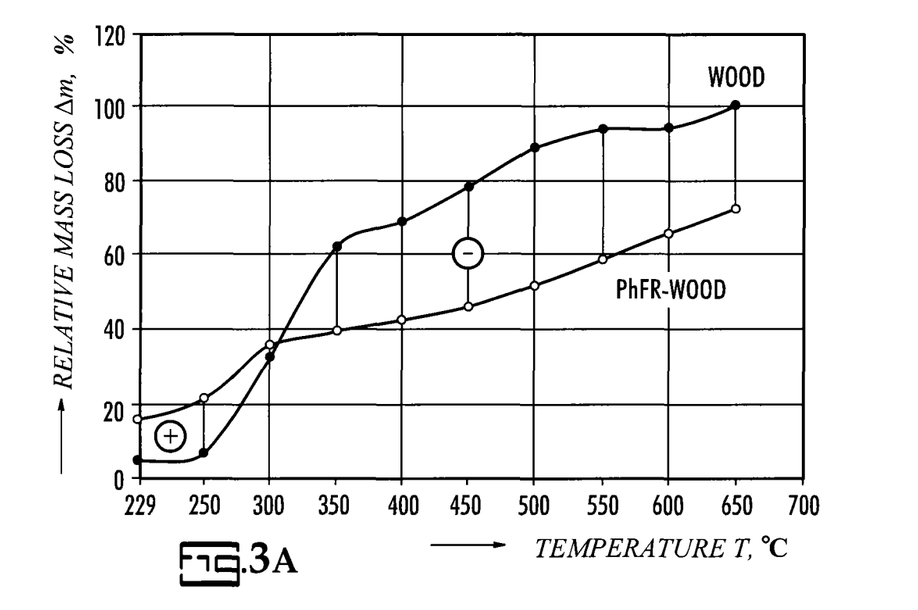
FIGS. 3A and 3B are Integral (a) and differential (b) curves of alteration of the relative mass loss ΔM.
Figure 4:
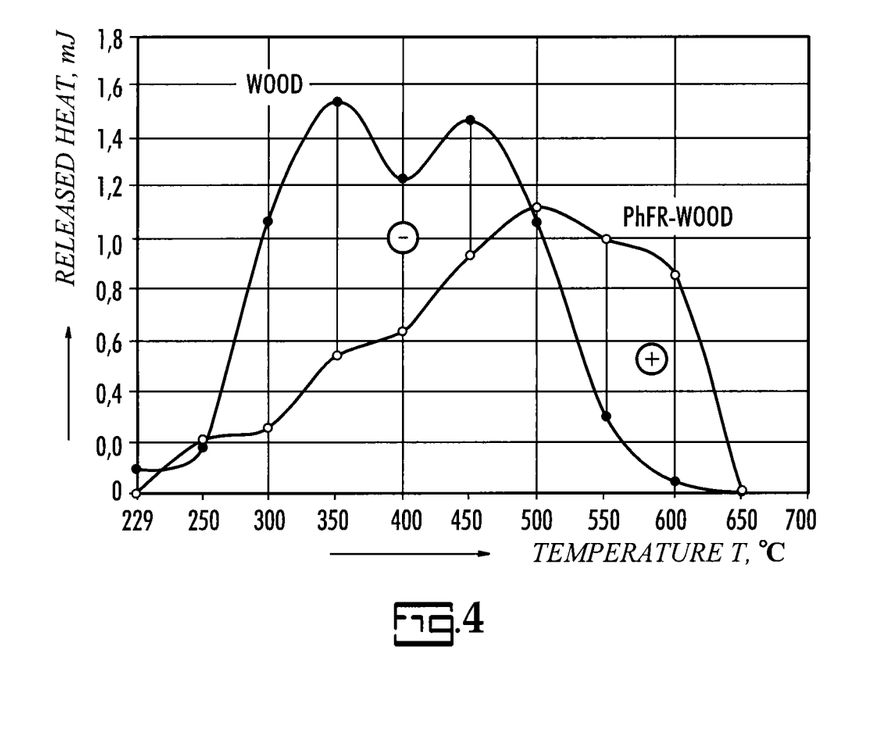
FIG. 4—Comparison of the thermal effects of the tested samples, beyond the ignition point (IP, T>229° C.) of the protected wood sample (PhFR—wood).

The relative loss of mass ΔM of the fire-protected sample remains significantly lower (by approximately 30%) above 300° C., FIG. 3a. The released heat also corresponds to the suppressed flaming, FIG. 4.

Figure 3B:
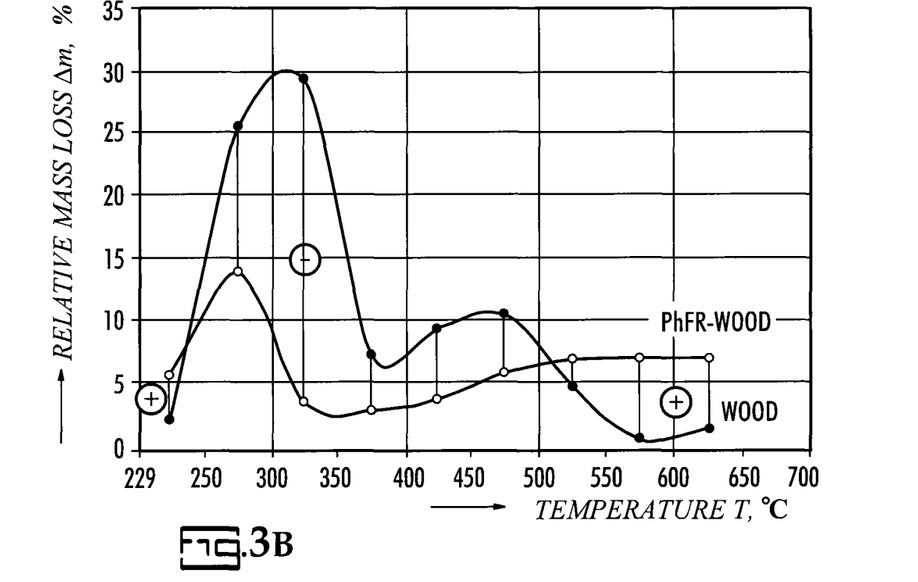

The maximum loss of mass is registered at approximately 280° C. ΔM(max)=14% (i.e. below 300° C.), while in the control sample, this takes place at 315° C., ΔM(max)=30% (i.e. above 300° C.), FIG. 3b.

At a temperature of 650° C., the natural wood burnt completely (100%), while the fire-protected one lost only about 65% of its initial mass, FIG. 3a.

The composition from the Example 6 can be combined with any suitable insecticide and any suitable mold inhibitor. The protected wood is in conformity with standard BDS 16359/86 and is classified as self-extinguishing material.

The flame retarded pine and beech wood have low smoke developed indexes values, Table 5-6.

TABLE 5

Smoke developed by fire-protected pine wood

| test No. | T °C. | Type of material | $I_o$ μA | $I_{min}$ μA | $I_{min\,av.}$ | $D_{max\,av.}$ (m³/m · kg) | Note | Conclusions |
|---|---|---|---|---|---|---|---|---|
| 1-1 | 300 | Pine wood | 20 | 17.60 | 17.26 | 33.46 | Only smoldering of the sample is observed, with minor flaming | low smoke developed index |
| 1-2 | 300 | Pine wood | 20 | 17.10 | | | | |
| 1-3 | 300 | Pine wood | 20 | 17.10 | | | | |

TABLE 5-continued

Smoke developed by fire-protected pine wood

| test No. | T °C. | Type of material | $I_o$ μA | $I_{min}$ μA | $I_{min\,av.}$ | $D_{max\,av.}$ ($m^3/m \cdot kg$) | Note | Conclusions |
|---|---|---|---|---|---|---|---|---|
| 2-1 | 400 | Pine wood | 20 | 14.50 | 14.73 | 69.46 | The flame does not have a gray layer smoke | medium smoke developed index |
| 2-2 | 400 | Pine wood | 20 | 14.90 | | | | |
| 2-3 | 400 | Pine wood | 20 | 14.80 | | | | |
| 3-1 | 600 | Pine wood | 20 | 17.80 | 17.96 | 24.43 | Full charring of the sample with slowing down smoke | low smoke developed index |
| 3-2 | 600 | Pine wood | 20 | 18.20 | | | | |
| 3-3 | 600 | Pine wood | 20 | 17.90 | | | | |

TABLE 6

Smoke developed by fire-protected Beech

| test No. | T °C. | Type of material | $I_o$ μA | $I_{min}$ μA | $I_{min\,av.}$ | $D_{max\,av.}$ ($m^3/m \cdot kg$) | Note | Conclusions |
|---|---|---|---|---|---|---|---|---|
| 1-1 | 300 | Beech | 20 | 18.50 | 18.33 | 19.80 | No flame is observed, only smoldering | low smoke developed index |
| 1-2 | 300 | Beech | 20 | 18.40 | | | | |
| 1-3 | 300 | Beech | 20 | 18.10 | | | | |
| 2-1 | 400 | Beech | 20 | 13.40 | 14.63 | 71.01 | More time is required for smoke development to start | medium smoke developed index |
| 2-2 | 400 | Beech | 20 | 14.80 | | | | |
| 2-3 | 400 | Beech | 20 | 15.70 | | | | |
| 3-1 | 600 | Beech | 20 | 18.90 | 19.43 | 6.56 | Almost no smoke | low smoke developed index |
| 3-2 | 600 | Beech | 20 | 19.60 | | | | |
| 3-3 | 600 | Beech | 20 | 19.80 | | | | |

Paper, Cardboard, Pressed Cardboard, Corrugated Board

Example 7

In this embodiment the flame retardant for paper contains, with percentages (%) by mass: 85% orthophosphoric acid—25.0, urea—5.0, triethanolamine—9.0, ammonia water—30.0, polydimethylsiloxane with viscosity $100 \cdot 10^{-6}$ $m^2/s$—3.1, mixture of triethanolaminestearatemethosulphate and ethoxylated alcohol—8.0 and water—19.9.

The composition is prepared, based on the method, detailed in Example 1.

The flame retardant is applicable to fire protection and slowing down smoke development of paper products. The impregnation may be performed by industrial scale-up treatment or "in situ", by spraying under pressure, brush or roller application and by means of plasma-assisted impregnation. The industrial impregnation of the paper is carried out by the continuous process. The phosphates content in the material as $P_2O_5$% is within the range 2.44-4.88%.

The combustibility of the impregnated and non-impregnated paper by spraying was determined in accordance with BDS 16359/86 in a "ceramic tube".

The non-treated paper with dimensions 150×30×1 mm and weight 0.001 kg upon applying gas burner (propane-butane) flame with height of 200 mm, ignites immediately and burns for 7-9 seconds. There is a mass loss ΔM=80-82%.

The impregnated paper with the flame retardant, prepared by the composition from Example 7, with dimensions 150×30×1 mm and weight 0.001 kg upon applying gas burner (propane-butane) flame with height of 200 mm for 60 seconds does not ignite, but just chars, without smoldering. There is a mass loss ΔM=47-52%. The smoke developed index of the impregnated paper, compared to the non-treated one, is with very low value, Table 7.

TABLE 7

Smoke developed by paper

| test No. | T °C. | Type of material | $I_o$ μA | $I_{min}$ μA | $I_{min\,av.}$ | $D_{max\,av.}$ ($m^3/m \cdot kg$) | Note | Conclusions |
|---|---|---|---|---|---|---|---|---|
| 1-1 | 300 | Non-treated Paper | 25 | 18.10 | 18.30 | 70.90 | no self-ignition | medium smoke developed index |
| 1-2 | 300 | Non-treated Paper | 25 | 18.50 | | | | |
| 1-3 | 300 | Non-treated Paper | 25 | 18.30 | | | | |
| 2-1 | 450 | Non-treated Paper | 25 | 2.10 | 2.17 | 556.20 | no self-ignition | high smoke developed index |
| 2-2 | 450 | Non-treated Paper | 25 | 2.40 | | | | |

TABLE 7-continued

Smoke developed by paper

| test No. | T °C. | Type of material | $I_o$ μA | $I_{min}$ μA | $I_{min\,av.}$ | $D_{max\,av.}$ (m³/m · kg) | Note | Conclusions |
|---|---|---|---|---|---|---|---|---|
| 2-3 | 450 | Non-treated Paper | 25 | 2.00 | | | | |
| 3-1 | 600 | Non-treated Paper | 25 | 23.10 | 23.17 | 17.30 | self-ignition at 600° C. after 5-6 s and burns fast 8-10 s light smoke | low smoke developed index |
| 3-2 | 600 | Non-treated Paper | 25 | 23.00 | | | | |
| 3-3 | 600 | Non-treated Paper | 25 | 23.40 | | | | |
| 1-1 | 300 | Treated Paper | 25 | 19.00 | 19.16 | 60.33 | no self-ignition | medium smoke developed index |
| 1-2 | 300 | Treated Paper | 25 | 19.40 | | | | |
| 1-3 | 300 | Treated Paper | 25 | 19.10 | | | | |
| 2-1 | 450 | Treated Paper | 25 | 15.00 | 15.20 | 113.03 | no self-ignition | medium smoke developed index |
| 2-2 | 450 | Treated Paper | 25 | 15.40 | | | | |
| 2-3 | 450 | Treated Paper | 25 | 15.20 | | | | |
| 3-1 | 600 | Treated Paper | 25 | 12.20 | 12.43 | 158.43 | self-ignition at 600° C. after 8-11 s and the smoke is light | medium smoke developed index |
| 3-2 | 600 | Treated Paper | 25 | 12.70 | | | | |
| 3-3 | 600 | Treated Paper | 25 | 12.40 | | | | |

Foamed Polyurethane

Example 8

In this embodiment the flame retardant for foamed polymers, such as foamed polyurethane contains, with percentages (%) by mass: 85% orthophosphoric acid—28.0, urea—4.0, triethanolamine—7.0, ammonia water—27.0, polydimethylsiloxane with viscosity $350 \cdot 10^{-6}$ m²/s—0.5, mixture of triethanolaminestearatemethosulphate with polyethyleneglycol 20 and polyoxyethylether of the lauryl alcohol n=7-10 and water—23.5.

The composition is prepared, based on the method, detailed in Example 1.

The phosphates content in the material as $P_2O_5$% is within the range 14.30-17.90%.

The impregnation of foamed polyurethane products may be performed by dipping, by continuous process in industrial environment, and by spraying under low or high pressure. The burning behaviour of the impregnated soft and hard foamed polyurethane was determined in accordance with BDS ISO 9772/2004, JAR(FAR)§25.853 and Fiche UIC 564-2. The impregnated materials are classified as self-extinguishing materials.

Cellular Polystyrene

Example 9

In other embodiment the flame retardant for impregnation of expanded and extruded cellular polystyrene contains with percentages (%) by mass: 85% orthophosphoric acid—15.0, urea—3.0, triethanolamine—3.0, ammonia water—15.0, polydimethylsiloxane with viscosity $100 \cdot 10^{-6}$ m²/s—2.0, mixture of alkylethersulphates with alkyl chain length ($C_6$-$C_{18}$), alkylamidopropylenebetaine and etoxylated alcohol—15 and water—47.0.

The composition is prepared, based on the method, detailed in Example 1.

The fire protection of polymer materials for thermal insulation from expanded (EPS) or extruded (XPS) cellular polystyrene is performed in industrial environment or "in situ" by means of brush application, roller application, spraying under pressure or plasma-assisted impregnation. The phosphates content in the material as $P_2O_5$% is 5.51%.

The burning characteristics of the extruded and expanded cellular polystyrene, impregnated with the flame retardant was determined in accordance with BDS ISO 9772/2004 "Cellular plastics. Determination of horizontal burning characteristics of small specimens, subjected to a small flame".

The impregnated cellular polystyrene materials are classified in Class HF-1/self-extinguishing materials.

The smoke developed index of the cellular polystyrene, impregnated with the flame retardant is lower than that of the non-impregnated, Table 8.

TABLE 8

Smoke developed by cellular polystyrene

| test No. | T °C. | Type of material | $I_o$ μA | $I_{min}$ μA | $I_{min\,av.}$ | $D_{max\,av.}$ (m³/m · kg) | Note | Conclusions |
|---|---|---|---|---|---|---|---|---|
| 1-1 | 300 | Non-treated Polystyrene | 25 | 7.40 | 7.60 | 270.56 | no self-ignition | medium smoke developed index |
| 1-2 | 300 | Non-treated Polystyrene | 25 | 7.90 | | | | |

TABLE 8-continued

Smoke developed by cellular polystyrene

| test No. | T °C. | Type of material | $I_o$ μA | $I_{min}$ μA | $I_{min\,av.}$ | $D_{max\,av.}$ (m³/m·kg) | Note | Conclusions |
|---|---|---|---|---|---|---|---|---|
| 1-3 | 300 | Non-treated Polystyrene | 25 | 7.50 | | | | |
| 2-1 | 450 | Non-treated Polystyrene | 25 | 5.20 | 5.23 | 355.43 | no self-ignition | medium smoke developed index |
| 2-2 | 450 | Non-treated Polystyrene | 25 | 5.00 | | | | |
| 2-3 | 450 | Non-treated Polystyrene | 25 | 5.50 | | | | |
| 3-1 | 600 | Non-treated Polystyrene | 25 | 8.10 | 8.40 | 247.76 | self-ignition at 600° C. after 3-4 s, burns 26-31 s with black smoke | medium smoke developed index |
| 3-2 | 600 | Non-treated Polystyrene | 25 | 8.50 | | | | |
| 3-3 | 600 | Non-treated Polystyrene | 25 | 8.60 | | | | |
| 1-1 | 300 | Treated Polystyrene | 25 | 8.40 | 8.70 | 239.86 | no self-ignition | medium smoke developed index |
| 1-2 | 300 | Treated Polystyrene | 25 | 8.70 | | | | |
| 1-3 | 300 | Treated Polystyrene | 25 | 9.00 | | | | |
| 2-1 | 450 | Treated Polystyrene | 25 | 6.30 | 6.20 | 316.86 | no self-ignition | medium smoke developed index |
| 2-2 | 450 | Treated Polystyrene | 25 | 5.90 | | | | |
| 2-3 | 450 | Treated Polystyrene | 25 | 6.40 | | | | |
| 3-1 | 600 | Treated Polystyrene | 25 | 11.10 | 11.10 | 184.46 | self-ignition at 600° C. after 4-9 s, burns with white smoke | medium smoke developed index |
| 3-2 | 600 | Treated Polystyrene | 25 | 10.80 | | | | |
| 3-3 | 600 | Treated Polystyrene | 25 | 11.40 | | | | |

Natural Leather

Example 10

In this embodiment the flame retardant for leather contains with percentages (%) by mass: 85% orthophosphoric acid—20.0, urea—5.0, triethanolamine—5.0, ammonia water—18, polydimethylsiloxane with viscosity $20 \cdot 10^{-6}$ m²/s—0.5, alkylamidopropylbetaine—10.0 and water—41.5.

The phosphates content in the material as $P_2O_5$% is within the range 2.44-4.88%. The fire protection of leather is performed in industrial environment or "in situ" by spraying with pulverized device.

The combustibility of the leather impregnated by spraying was determined according to BDS 16359/86 in a "ceramic tube" and is classified as self-extinguishing material.

Comparative Examples

The main methods for fire protection of flammable materials are:
1. Flame retardants used as additives to materials such as plastics, textiles, foams, timber;
2. Flame retardant impregnation of porous polymer materials—textiles, wooden materials, paper, corrugated board, cellular polystyrene, foamed polyurethane;
3. Flame retardants used during the production process for chemical modification of some plastic materials;
4. Fire protective coating method.

The flame retardant compositions of the present invention are applied by the impregnation method.

It is known in the prior art, that the fire protection efficiency and reliability depends on the insulating char depth during exposure to heat (fire). Therefore, the mode of action of the flame retardant compositions is determined by their amount and penetration depth into the polymer matrix.

The fire protection efficiency of the biodegradable halogen-free flame retardants' composition according to the present invention (indicated as D) is illustrated by comparison with BG 33508 (indicated as D1) and PCT US 2008/138534 (indicated as D2) for wooden materials in the examples given hereunder.

Example 11

The flame retardant compositions are prepared according to D, D1 and D2. For all the specimens, treated with the above cited compositions, the amount of the flame retardants per one square meter is equal –490 g/m2.

The method for fire protection of the wooden materials is the energy saving method—impregnation by roller.

Then the specimens are left to dry at room temperature and normal atmospheric pressure. The results are given in Table 9.

Example 12

The flame retardant compositions according to the present invention (D) are compared with the compositions according to D1 and D2.

The specimens of the textile materials are impregnated by spraying. Then they are left to dry at room temperature and normal atmospheric pressure.

The amount of the flame retardant compositions according to D is determined experimentally for each textile material depending on the fiber types, the structure and the weight of the fabrics, their preliminary treatment and the desired self-extinguishing level. The impregnation carried out is two-side. The amount of the composition per one square meter of the textile material is divided into 2—the first part for the face side and the second part for the back side of the fabric.

The compositions according to D, D1 and D2 are applied in equal amounts for each textile material.

The results are given in Table 10.

Example 13

The composition according to the present invention (D) is compared with the compositions according to D1 and D2.

The compositions are applied for fire protection of testliner and corrugated board. The amount of the flame retardants per one square meter is the same for all the compositions.

The impregnation of the specimens is carried out by brush.

The specimens are left to dry at room temperature and normal atmospheric pressure.

The results are given in Table 11.

Example 14

The composition for fire protection of foamed polyurethane according to D is compared with the composition according to D1 and the composition according to D2.

The amount of the flame retardant compositions per one square meter is one and the same for all the used flame retardants.

The impregnation of the specimens is by brush.

The specimens are left to dry at room temperature and normal atmospheric pressure.

The results are given in Table 12.

Example 15

The composition for expanded polystyrene according to the present invention (D) is compared with the compositions according to (D1) and (D2).

The amount of the flame retardant compositions per one square meter is one and the same for all the used flame retardants.

The impregnation is by brush.

The tested specimens are left to dry at room temperature and normal atmospheric pressure.

The results are given in Table 13.

TABLE 9

| No 1 | Test methods 2 | Flame retarded materials 3 | Test results for D 4 | Test results for D1 5 | Test results for D2 6 |
|---|---|---|---|---|---|
| 1. | Penetration depth | PINE WOOD | 5 mm. | 3 mm. | 3.5 mm. |
|    |                   | BEECH WOOD | 10 mm. | 6 mm. | 4 mm. |
| 2. | BDS 16359/86 Protective agents for wood. | | Average mass loss | Average mass loss | Average mass loss |
|    |                   | PINE WOOD | 2.23% | 7.30% | 6.80% |
|    |                   | BEECH WOOD | 1.56% | 5.15% | 4.45% |
|    |                   | OAK WOOD | 3.96% | 5.00% | 4.25% |
|    |                   | MDF | 2.10% | 5.78% | 5.26% |
|    |                   | DOUGLAS FIR | 3.26% | 6.20% | 5.38% |
| 3. | Methods, based on DIN 4102 Part 1. | PINE WOOD | Class B1 | Class B2 | Class B1 |
|    |                   | MDF | Self-extinguishing | Ignitable | Ignitable |
| 4. | BDS EN ISO 11925-2 Reaction to fire tests - Ignitability of products subjected to direct impingement of flame - Part 2 | PINE WOOD | Self-extinguishing | Self-extinguishing | Self-extinguishing |
| 5. | BDS EN ISO 9239-1. Reaction to fire tests for floorings - Part 1: Determination of the burning behaviour using a radiant heat source | PINE WOOD | Self-extinguishing (class $B_{fl}$sl) according to BDS EN 13501-1 | Ignitable | Ignitable |
| 6. | CAN/ULC-S102 (similar method ASTM E 84). Standard Method of Test for Surface Burning Characteristics of Building Materials and Assemblies | DOUGLAS FIR | Flame spread FSC - 32 | Ignitable | Ignitable |
| 7. | Smoke development according to a method, described in PCT BG 2010/000005 | PINE WOOD | Low smoke developed index $D_m < 50 [m^3 \cdot m^{-1} \cdot kg^{-1}]$ | Medium smoke developed index $D_m > 50 [m^3 \cdot m^{-1} \cdot kg^{-1}]$ | Medium smoke developed index $D_m > 50 [m^3 \cdot m^{-1} \cdot kg^{-1}]$ |
| 8. | Smoke development according to BDS EN ISO 9239-1 | PINE WOOD | Determination of smoke development 152.7% · min Limit: ≤750% · min | Determination of smoke development >750% · min | Determination of smoke development >750% · min |
| 9. | Smoke development according to CAN/ULC-S102 (similar method ASTM E 84) | DOUGLAS FIR | Smoke developed index SDI –170 Limit SDI < 450 | SDI > 450 | SDI > 450 |
| 10. | Biodegradable flame retarded corrugated board | PINE WOOD BEECH WOOD DOUGLAS FIR | Biodegradable to a greater degree than the untreated material | Biodegradable to a less degree than the untreated material | Biodegradable to a less degree than the untreated material |

TABLE 10

| No 1 | Test methods 2 | Flame retarded materials 3 | Test results for D 4 | Test results for D1 5 | Test results for D2 6 |
|---|---|---|---|---|---|
| 1. | BDS EN ISO 6941 Textile fabrics - Burning behaviour. Measurement of flame spread properties of vertically oriented specimens. | "Nia" fabric Composition: 100% cotton. | Self-extinguishing (Class 1) | Ignitable | Ignitable |
| | | "Clam" fabric Composition: 70% cotton; 30% polyester. | Self-extinguishing (Class 1) | Ignitable | Ignitable |
| | | "Mini Mat" fabric Composition: 100% polyester. | Self-extinguishing (Class 1) | Ignitable | Ignitable |
| | | Plush fabric Composition: 40% polyacrylnitrile; 40% polyester/viscose; 20% cotton/polyester. | Self-extinguishing (Class 1) | Ignitable | Ignitable |
| 2. | JAR (FAR) 25.853 This method is applicable to interior polymer materials, which are used in civil and cargo airplanes | Polyamide carpet Composition: 100% polyamide. | Self-extinguishing | Ignitable | Ignitable |
| | | Polypropylene carpet Composition: 100% polypropylene | Self-extinguishing | Ignitable | Ignitable |
| 3. | Fiche UIC 564-2. Appendix 5. Test method for determining the fire resistance of coated and uncoated textiles in passenger carrying railway vehicles | "Liliana" fabric composition: 100% polyacrylnitrile | Class A | Class C | Class C |
| 4. | Biodegradable flame retarded corrugated board | "Nia" fabric "Clam" fabric "Mini Mat" fabric Plush fabric Polyamide carpet Polypropylene carpet | Biodegradable to a greater degree than the untreated material | Biodegradable to a less degree than the untreated material | Biodegradable to a less degree than the untreated material |

TABLE 11

| No | Test methods | Flame retarded materials | Test results For D | Test results For D1 | Test results For D2 |
|---|---|---|---|---|---|
| 1. | Capillary activity of solutions of flame retardants, s | Single wall corrugated board | 4.8 s | 297.0 s | 61.3 s |
| 2. | Paper and board. Method based on BDS 16359/86 for determination of ignitability group | Testliner | Self-extinguishing | Ignitable | Ignitable |
| 3. | Paper and board. Method based on JAR (FAR) 25.853 for determination of ignitability group | Single faced corrugated board | Self-extinguishing | Ignitable | Ignitable |
| 4. | Paper and board. Method based on JAR (FAR) 25.853 for determination of ignitability group | Single wall corrugated board | Self-extinguishing | Ignitable | Ignitable |
| 5. | Smoke development according to a method, described in D | Testliner | Low smoke developed index $D_m < 50 [m^3 \cdot m^{-1} \cdot kg^{-1}]$ | High smoke developed index $D_m \geq 500 [m^3 \cdot m^{-1} \cdot kg^{-1}]$ | High smoke developed index $Dm \geq 500 [m^3 \cdot m^{-1} \cdot kg^{-1}]$ |
| 6. | Smoke development according to a method, described in D | Single faced corrugated board | Low smoke developed index $D_m < 50 [m^3 \cdot m^{-1} \cdot kg^{-1}]$ | High smoke developed index $D_m \geq 500 [m^3 \cdot m^{-1} \cdot kg^{-1}]$ | High smoke developed index $D_m \geq 500 [m^3 \cdot m^{-1} \cdot kg^{-1}]$ |
| 7. | Smoke development according to a method, described in D | Single wall corrugated board | Low smoke developed index $D_m < 50 [m^3 \cdot m^{-1} \cdot kg^{-1}]$ | High smoke developed index $D_m \geq 500 [m^3 \cdot m^{-1} \cdot kg^{-1}]$ | High smoke developed index $D_m \geq 500 [m^3 \cdot m^{-1} \cdot kg^{-1}]$ |

TABLE 11-continued

| No | Test methods | Flame retarded materials | Test results For D | Test results For D1 | Test results For D2 |
|----|---|---|---|---|---|
| 8. | Biodegradable flame retarded corrugated board | Single wall corrugated board | Biodegradable to a greater degree than the untreated material | Biodegradable to a less degree than the untreated material | Biodegradable to a less degree than the untreated material |

TABLE 12

| No | Test methods | Flame retarded materials | Test results for D | Test results for D1 | Test results for D2 |
|----|---|---|---|---|---|
| 1. | BDS ISO 9772: 2004 Cellular plastics. Determination of horizontal burning characteristics of small specimens subjected to a small flame | Polyurethane | Class HF-1 | Class HF-2 | Class HF-2 |
| 2. | Smoke development according to a method, described in Present invention | Polyurethane | Low smoke developed index $D_m < 50 [m^3 \cdot m^{-1} \cdot kg^{-1}]$ | High smoke developed index $D_m \geq 500 [m^3 \cdot m^{-1} \cdot kg^{-1}]$ | High smoke developed index $D_m \geq 500 [m^3 \cdot m^{-1} \cdot kg^{-1}]$ |
| 3. | Biodegradable flame retarded corrugated board | Polyurethane | Biodegradable to a greater degree than the untreated material | Biodegradable to a less degree than the untreated material | Biodegradable to a less degree than the untreated material |

TABLE 13

| No | Test methods | Flame retarded materials | Test results for D | Test results for D1 | Test results for D2 |
|----|---|---|---|---|---|
| 1. | BDS ISO 9772: 2004 Cellular plastics. Determination of horizontal burning characteristics of small specimens subjected to a small flame | Expanded polystyrene | Class HF-1 | Class HF-2 | Class HF-2 |
| 2. | Smoke development according to a method, described in Present invention | Expanded polystyrene | Low smoke developed index $D_m < 50 [m^3 \cdot m^{-1} \cdot kg^{-1}]$ | High smoke developed index $D_m \geq 500 [m^3 \cdot m^{-1} \cdot kg^{-1}]$ | High smoke developed index $D_m \geq 500 [m^3 \cdot m^{-1} \cdot kg^{-1}]$ |
| 3. | Biodegradable flame retarded corrugated board | Expanded polystyrene | Biodegradable to a greater degree than the untreated material | Biodegradable to a less degree than the untreated material | Biodegradable to a less degree than the untreated material |

The invention claimed is:

1. Composition of biodegradable halogen-free flame retardants, including orthophosphoric acid, urea, triethanolamine, ammonia water and surfactants, characterized by that it contains also polydimethylsiloxane and the surfactants are anionic, cationic, amphoteric or non-ionic, or mixtures thereof, with the following quantitative ratios of the components with percentages by mass: orthophosphoric acid from 15 to 30, urea from 3 to 7, triethanolamine from 3 to 10, ammonia water from 15 to 30, polydimethylsiloxane from 0.1 to 4; surfactants from 7.1 to 15 and water to 100, and wherein the polydimethylsiloxane is with viscosity determined at 25° C., from $20 \times 10^{-6}$ to $350 \times 10^{-6}$ m²/s.

2. Composition, according to claim 1, characterized by that the anionic surfactant is selected from the group consisting of alkylsulphates with a formula $ROSO_3^-$; alkylethersulphates with a formula: $R(CH_2CH_2O)_nOSO_3^-$; alkylsulphonates with a formula: $RSO_3^-$; salts of the fatty acids with a formula: $RCOO^-$; and sulphosuccinates with a formula: $R(CH_2CH_2O)_nOCOCHSO_3CH_2COO^-$ or mixtures thereof, where the R radical may be alkyl, alkene, alkyne, alkylaryl, and n has a value of 2 or 3.

3. Composition, according to claim 1, characterized by that the cationic surfactant is selected from the group consisting of quaternary esters with a formula: $R_1(OCH_2CH_2)(R_2OCH_2CH_2)CH_3(CH_2CH_2OH)N^+CH_3OSO_3^-$ and quaternary ammonium chlorides with a formula: $R_1R_2(CH_3)_2N^+Cl^-$, where $R_1$ and $R_2$ are alkyl radicals with chain length of $C_7$-$C_{22}$.

4. Composition, according to claim 1, characterized by that the amphoteric surfactant is selected from the group consisting of alkylbetaines with a formula: $R(CH_3)_2N^+CH_2COO^-$ and alkylamidopropylbetaines with a formula: $RCONH(CH_2)_3(CH_3)_2N^+CH_2COO^-$, where R may be alkyl, alkene, alkyne, alkylaryl with chain length of $C_8$-$C_{18}$.

5. Composition, according to claim 1, characterized by that the non-ionic surfactant is selected from the group consisting of ethoxylated alcohols with a formula: $R_1(CH_2CH_2O)_nOH$ and ethoxylated alkylphenols with a formula: $R_2Ar(CH_2CH_2O)_nOH$, where $R_1$ is alkyl radical with chain length from $C_6$ to $C_{22}$, $R_2$ is octyl or nonyl radical and Ar is aryl radical.

6. A method of using the composition according to claim 1 to provide flame retardancy to materials selected from the group consisting of hydrophilic textile materials, hydrophobic textile materials, wooden materials, cellulosic materials, natural or artificial leather foamed polymers; and cellular polystyrene, wherein the method comprises the step of:
- (a) impregnating materials at atmospheric pressure and room temperature using a pulverized device from a distance of at least 40 cm;
- (b) observing a consumption rate for the materials; and then
- (c) drying the materials at room temperature.

7. A method for providing flame retardancy to materials selected from the group consisting of hydrophilic textile materials, hydrophobic textile materials, cellulosic materials, and foamed polymeric materials, said method comprises the step of:
- (a) passing materials through a bath containing the composition according to claim 1;
- (b) dipping said materials in said bath of the flame retardant according to the invention;
- (c) after soaking in the bath for a few seconds, passing the materials between rollers that apply controlled pressure; and then
- (d) passing said materials through a drying machine to dry.

8. The method of using the composition according to claim 1 for providing flame retardancy to wooden material selected from the group consisting of solid wood, wooden items, beams and boards, said method comprising the steps of:
- (a) introducing the wooden material into an autoclave;
- (b) then impregnating said wooden material with the composition according to claim 1 while by alternating between vacuum and high pressure, wherein flame retardancy is thereby provided in a single autoclave; and then
- (c) drying said wooden material by "vacuum—atmospheric pressure—vacuum" or "vacuum—high pressure—vacuum".

9. A method for plasma-assisted impregnation with the composition according to claim 1 for providing flame retardancy to materials selected from the group consisting of hydrophilic textile materials, hydrophobic textile materials, wooden materials, solid wood, wooden products, wooden beams, wooden boards, plywood, plywood-based products, wood particle boards, wood fibers boards, MDF, HDF, foamed polymers foamed polyurethane, expanded cellular polystyrene, and extruded cellular polystyrene, wherein the method comprises the steps of:
- (a) treating the materials at atmospheric pressure using a plasma device with cold plasma obtained from a barrier electric discharge; and then
- (b) impregnating the treated materials with the composition according to claim 1.

10. A method for providing flame retardancy to materials selected from the group consisting of wooden materials, solid wood, wooden products, beams, boards, plywood, plywood-based products, wood particle boards, wood fibers boards, MDF, HDF, foamed polymers, polyurethane expanded cellular polystyrene, and extruded cellular polystyrene, said method comprising the step of applying the composition according to claim 1 by dipping, by brushing or by rolling said composition onto said material.

11. A method for extinguishing fires using the composition according to claim 1, comprising the step of adding the composition according to claim 1 to fluids in fire-extinguishers or sprinkler systems.

* * * * *